2,759,461

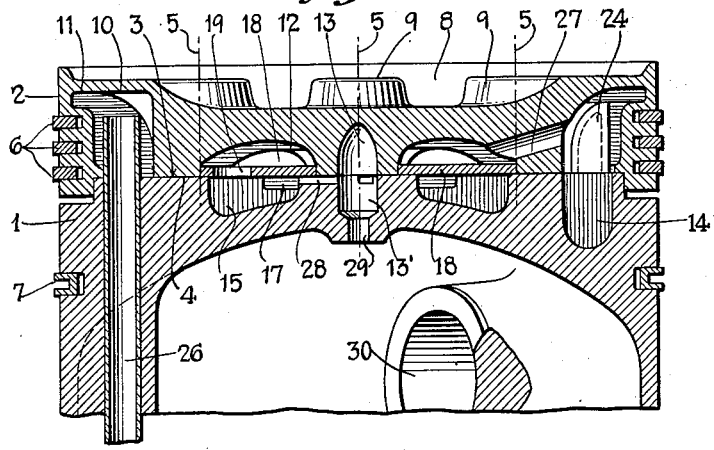
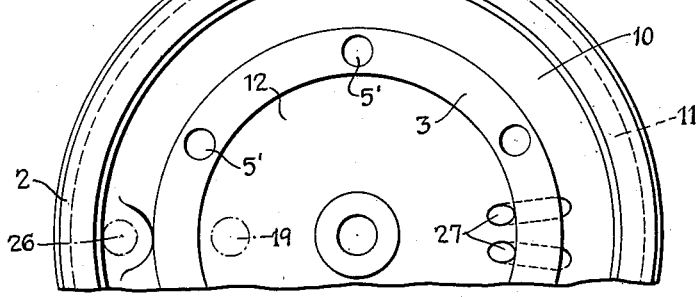
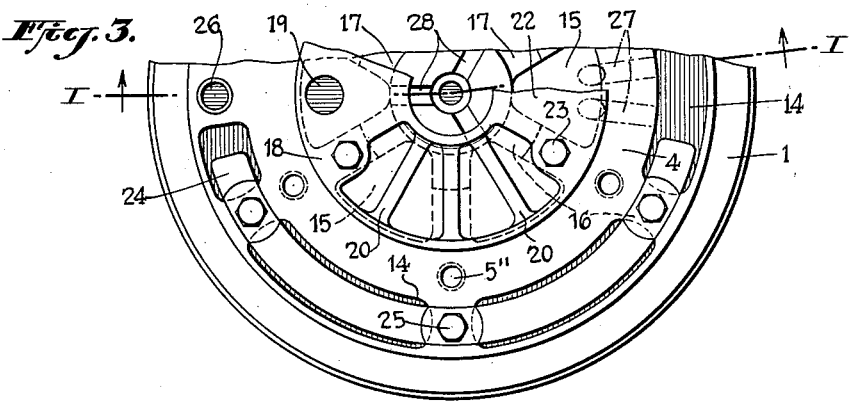
INVENTORS.
KARL MAYBACH.
MARCUS von KIENLIN.
BY RICHARD SEIFERT.
ATTORNEY.

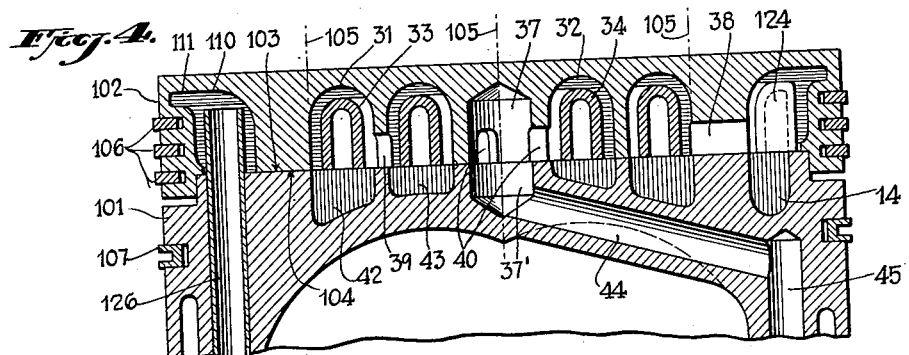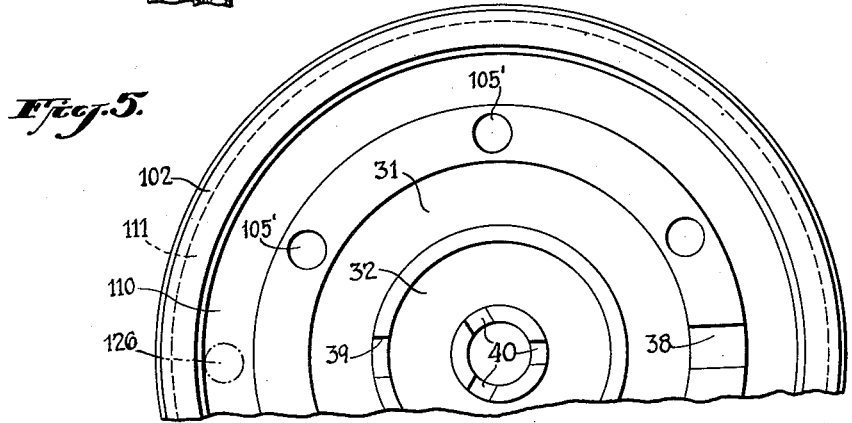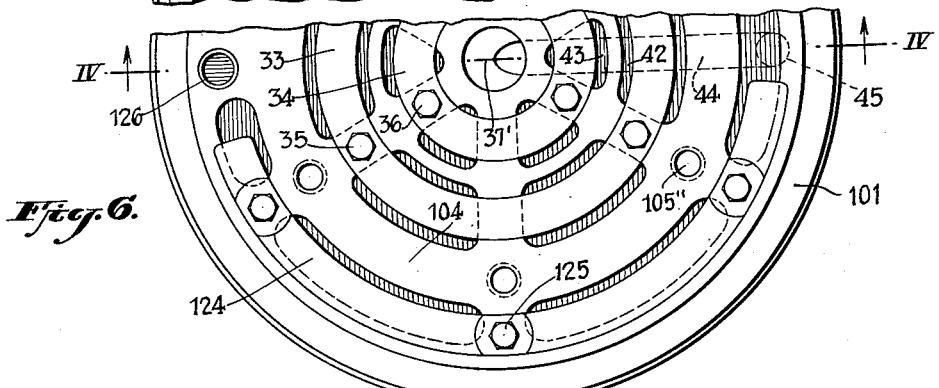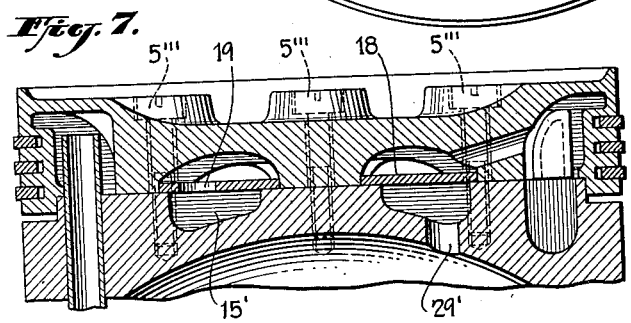

OIL-COOLED PISTON FOR A HIGH SPEED INTERNAL COMBUSTION ENGINE, PARTICULARLY FOR A DIESEL MOTOR FOR VEHICLES

Karl Maybach, Markus von Kienlin, and Richard Seifert, Friedrichshafen, Germany, assignors to Maybach Motorenbau G. m. b. H., Friedrichshafen, Germany, a corporation of Germany Application May 26, 1954, Serial No. 432,548

Claims priority, application Germany June 16, 1953

10 Claims. (Cl. 123—41.35)

The present invention relates to a new oil-cooled piston for a high speed internal combustion engine of high specific output, particularly for diesel engines for vehicles having combustion chamber inlets and outlets which are substantially axial of the engine cylinder, the new piston including a main piston body and a piston head plate.

Several constructions of oil-cooled pistons have been proposed. The operation of most of them, however, is not reliable because they do not stand up under high loads during continuous operation, particularly of vehicles. In most cases, the cooling effect is insufficient, complicated cooling systems being used which are unsuitable for the removal of the heat. Consequently, wear is exceedingly great. Assembly and disassembly are cumbersome for overhauling purposes.

The present invention avoids all aforesaid disadvantages and has for its object a piston construction which is particularly suitable for high speed diesel engines for vehicles which comply with the increasing demands with respect to operating safety, resistance to wear, and simplicity of construction.

An object of the invention is to combine, in a special manner, certain features which are in part known in conventional constructions, to wit:

(a) The proportion of the thickness of the piston head plate and of the piston diameter is 1:6 to 1:4, depending on the material of which the plate is made;

(b) the piston head plate preferably supports all piston rings;

(c) at least two annular channels in the middle of the piston head plate form the main part of a spiral or labyrinth-like cooling system into which the cooling oil enters from the outside and from substantially the middle of which it is discharged;

(d) an outer annular channel serves for cooling the piston ring zone of the piston and extends outwardly above the upper piston ring;

(e) the channel walls extend archlike above the annular surfaces of the piston head plate resting on the main body of the piston and being preferably all in the same transverse plane.

For particularly high loads, additional annular channels or cooling chambers are provided in the piston head plate which may also be arranged in the main piston body, if the central zone of the piston head plate is very highly heated.

Of advantage is the arrangement of a central cooling chamber into which the cooling oil enters from the innermost annular channel, preferably through radial conduits. This ensures quick discharge of the cooling oil acting in the last cooling stage and receiving the heat from the central zone of the piston head.

The central cooling chamber is particularly effective if it is arranged not only in the piston head plate but also in the main piston body, and if it acts as a collecting chamber for the cooling system. If the proper amount of oil is used, it will be thrown back and forth in the central cooling chamber and will very efficiently absorb heat in the chamber.

In a further embodiment of the invention, the main annular contact surface of the piston head plate, which surface rests against the main piston body, is so arranged that the inner surface defined by the aforesaid annular contact surface is substantially as great as the annular surface extending between the main annular contact surface and the circumference of the piston. It follows from this condition that the main annular contact surface is in most cases arranged between the outer annular channel and the neighboring inner annular channel. This arrangement ensures that the loads acting on both surfaces are approximately balanced so that connecting means, for example bolts, for fastening the piston head plate to the main annular contact surface are stressed as little as possible. For easy interchange of the piston head plate, the connecting means as well as the piston head plate are removable in the direction of the cylinder head.

The cooling effect of the archlike cooling channels can be considerably increased by narrowing the annular channels in the piston head plate by means extending from the main piston body to a small flow area at the entire channel wall. Filling elements made of light material are suitable for accomplishing this, the filling elements being preferably connected with the main piston body so that they are not under the same strain as the piston head plate.

The cooling effect is further increased according to the invention by arranging recesses in the main piston body below each annular channel in the piston head plate and possibly in the main piston body. These recesses have a cooling effect similar to that produced by the above mentioned collecting chamber because the oil is thrown back and forth in the recesses by the reciprocating movement of the piston.

The recesses described in the paragraph next above may be so arranged as to form spokelike reinforcing ribs in the main piston body which interconnect the annular contact surfaces. In this way a very rigid piston is produced which withstands any load even if light metal is used for the main piston body and/or for the piston head plate.

The novel features which are considered characteristic of the invention are set forth with particularity in the appended claims. The invention itself however and additional objects and advantages thereof will best be understood from the following description of embodiments thereof when read in connection with the accompanying drawing in which Fig. 1 is a longitudinal sectional view along line I—I in Fig. 3 of a piston according to the invention;

Fig. 2 is a bottom view of the piston head plate forming part of the piston shown in Fig. 1;

Fig. 3 is a top view of the main piston body;

Fig. 4 is a longitudinal sectional view along line IV—IV in Fig. 6 of a modified piston according to the invention;

Fig. 5 is a bottom view of the piston head plate forming part of the piston shown in Fig. 4;

Fig. 6 is a top view of the main body of the piston as shown in Fig. 4;

Fig. 7 is a longitudinal section of a further modification of a piston according to the invention.

The same numerals designate the same parts in all figures.

Sections of channels and conduits described infra are horizontally shaded in the drawing and recesses are shaded vertically.

The tray piston shown in Figs. 1 to 3 comprises a main piston body 1 and a piston head or crown plate 2. The latter has an annular surface 3 resting on an annular surface 4 of the main piston body 1 and is connected with the main piston body by means of tension bolts which are not shown and whose position is indicated by center lines 5. The bolts extend through the annular surfaces 3 and 4, through bores 5' in the head plate 2 (Fig. 2) into threaded bores 5'' in the dome-shaped upper closure of the main piston body 1. The plate 2 carries all piston packing or compression rings 6. An oil wiping ring 7 is supported by the main piston body 1. The lower part of the main piston body 1 is not shown as it does not form part of the invention. The side of the piston head plate 2 facing the interior of the cylinder is provided with a central tray or trough 8 and with protuberances 9 for receiving the heads of the connecting bolts. The cooling system at the bottom of the plate 2 includes an outer annular channel 10 which has a portion 11 extending radially above the piston rings 6. An annular channel 12 and a central chamber 13 forming, together with a chamber 13' in the main piston body, a collecting chamber for the coolant, are arranged concentrically inside of the channel 10. The interior walls of the annular channels 10 and 12 as well as of the chamber 13 are arched relatively to the main annular contact surfaces 3 and 4 and to the central annular surface around the chamber 13, the latter surface being in the same plane as the surfaces 3 and 4. The surface of the main piston body 1 facing the head plate 2 is provided with recesses or cavities 14 and 15, the latter extending radially and inside of the former and being separated from each other by spokelike ribs 16. The inner recesses 15 are interconnected by means of an annular channel 17. A wall element serving also as a filler member 18 is arranged between the annular channel 12 in the head plate 2 and the recesses 15 in the main piston body 1, the filler member having an aperture 19 for connecting the annular chamber 12 with the annular channel 17 therebelow. The filler member 18 reduces the annular channel 12 to a small flow area and has radial cuts or recesses 20 and a sectorlike cut-out 21 at the side of the aperture 19 and another sectorlike cut-out 22 at the opposite side. The member 18 is mounted on the main piston body 1 by four screws 23. The flow area of the outer annular channel 10 in the piston head plate 2 is reduced, according to the invention, by two filler elements 24, each of which is fastened to the main piston body by three screws 25. A standpipe 26 embedded in the cylindrical wall of the main piston body terminates in the channel 10. At the side opposite the standpipe 26, conduits 27 connect channel 10 with the inner annular channel 12. Three radial conduits 28 connect the annular channel 17 in the main piston body with the coolant collecting chamber 13, 13'. A bore 29 connects the latter with the interior of the main piston body. Numeral 30 designates a boss for the piston pin in the main piston body 1.

The cooling oil flows through the standpipe 26 into the outer annular channel 10 and is divided into two circumferential streams, cooling particularly the piston ring portion. The two streams are united at the side opposite the standpipe and the coolant is conducted through conduits 27 to the inner annular channel 12 and more particularly into the sectorlike cut-out 22 of the filling member 18. Here, the oil again forms two circumferential streams which are whirled by the cuts 20 in the member 18 and which flow at great velocity because of the small height of the flow area. This not only substantially prevents the formation of deposits, for example, coking of the cooling oil, but it also effects thorough cooling of the particularly highly heated central zone of the piston head. The cooling oil is collected in the opposite portion of the annular channel 12, in the sectorlike cut-out 21, and flows through the aperture 19 into the recess 15 therebelow of the main piston body 1. The oil flows therefrom into the annular channel 17 and in part also into the other recesses 15, which are connected with the annular channel 17, and through the three radial conduits 28 into the collecting chamber 13, 13'. The oil flows from the latter through the bore 29 into the interior of the main piston body 1 and may be used for lubricating the piston pin. The oil supply may be so limited that the oil leaves the bore 29 in puffs. This, in combination with the reciprocating movement of the piston, has the effect of the oil being thrown back and forth not only in the chambers 14 and 15 but also, in its last cooling phase, in the chamber 13, 13', removing heat effectively in its last phase from the highly heated central zone of the piston head. The particular construction of the piston according to the invention affords approximately the same temperature difference at all places between the portion of the piston head plate which must be cooled and the cooling oil, if the oil supply is suitably controlled and the flow areas are suitably dimensioned. A great advantage of the structure according to the invention is the admission of the cooling oil to the piston ring zone whereby the temperature of that zone is held at the lowest possible level, and the removal of the oil from the hot zone whereby the absorbed heat is quickly removed. By suitable dimensions and arrangement of the arched annular channels and of the annular contact surfaces, a cross section is produced for the heat flowing through the contact surfaces which cross section increases with the distance from the piston head surface which receives the heat.

Numeral 101 in Figs. 4 to 6 designates the main piston body, numeral 102 the piston head plate resting with an annular surface 103 on an annular surface 104 of the main piston body, numeral 105' designates the centerlines of connecting bolts which extend through the surfaces 103 and 104, numeral 105 designates the holes in the piston head plate for the connecting bolts, and numeral 105'' designates the threaded holes for the connecting bolts in the main piston body. The radial extension of the annular surface portions 103, 104 between the outermost annular cooling channels is greater than that of the annular surface portions between other cooling channels. Numeral 106 designates the piston rings which are all supported by the head plate 102, only an oil wiping ring 107 being supported by the main piston body 101. The surface of the piston head body 101 is flat in contradistinction to the tray or trough shaped piston head shown in Figs. 1 to 3. The piston head plate 102 is provided with an outer annular channel 110 whose portion 111 is above the piston rings 106 and whose flow area is reduced by means of filler elements 124. The latter are made fast on the main piston body 101 by means of screws 125. The piston head plate is provided with two coaxial annular channels 31 and 32 whose flow areas are reduced by filler elements 33 and 34, respectively. The latter are made fast on the main piston body by means of screws 35 and 36, respectively. A chamber 37 is arranged within the inner annular channel 32. The outer annular channel 110 receives cooling oil through a standpipe 126 and is connected with the annular channel 31 by means of a conduit 38 which is diametrically opposed to the standpipe. Channels 31 and 32 are interconnected by a conduit 39 which is diametrically opposed to the channel 38. Three radial conduits 40 connect the channel 32 with the collecting chamber 37, 37'. The oil is removed from the latter through conduits 44 and 45. In contradistinction to the embodiment of the invention shown in Figs. 1 to 3, the oil is not discharged centrally of the piston but is conducted to the side of the piston from where it may be returned to the cooling oil circuit, for example by means of a standpipe. The top of the main piston body is provided with an annular channel 31 and with an annular recess 43 which communicates with the annular channel 32.

Fig. 7 illustrates a modification in which the central oil collecting chamber is omitted, the oil being discharged directly from an annular channel 15' through a bore or aperture 29' in the dome-shaped top portion of the main piston body. Bore 29' is diametrically opposed to the aperture 19. The modification shown in Fig. 7 omits the last cooling phase which is provided in the modifications according to Figs. 1 to 6. The contact surface between the piston head plate and the main piston body, however, is large enough to conduct objectionable heat from the piston head plate into the annular cooling channels and into the piston skirt. Fig. 7 shows tension bolts 5''' for connecting the head plate with the piston body.

As is obvious from the description of the embodiments of the invention illustrated in Figs. 1 to 6, the cooling oil enters the outer annular channel and is divided to form two semi-circular streams which are united in the annular channel at a point which is diametrically opposed to the point where the cooling oil enters the channel. Thereupon the oil enters an inner annular channel and is again divided into two semicircular streams which are reunited so that the oil may pass in similar manner through an additional inner channel which may be arranged in the main piston body (Fig. 1), or in the head plate (Fig. 4), and from which the oil is conducted through radial channels into a central collecting chamber. The oil flows from the latter either directly into the cavity of the main piston body and may be used for lubricating the piston pin (Fig. 1), or it may be conducted into the sidewall of the main piston body (Fig. 4) and may be returned to the cooling oil circuit by means of an additional standpipe. In the cooling systems according to the invention the oil flows in opposite direction in adjacent cooling channels which is beneficial to the heat removal and temperature compensation. This counterflow principle may also be materialized if the cooling oil enters the outer annular channel at two diametrically opposed points which arrangement may be preferred for large pistons.

The arrangement of the annular channels may be made so that the cooling oil performs a spiral flow. If a reduced flow resistance is desired, the oil may be conducted through a spiral from the outside toward the center of the piston without counterflow in adjacent annular channels.

Both systems may be combined by arranging a plurality of spirals, each having a return winding returning the cooling oil to the inlet of the spiral.

It is essential for the piston according to the invention that the cooling oil enter the cooling system at the outside and leave it at the center of the piston.

While specific embodiments of the invention have been shown and described, it will be apparent to those skilled in the art that various changes, modifications, substitutions, additions and omissions may be made therein without departing from the spirit and scope of the invention as set forth in the appended claims.

What is claimed is:

1. A cooled piston for a high speed internal combustion engine, comprising, in combination, a hollow main piston body having a top closure portion, a piston crown plate connected with said top closure portion and having a cylindrical peripheral portion, all compression rings of the piston being supported by said peripheral portion, an oil wiping ring supported by said main piston body, and a labyrinthlike cooling channel system including at least two coaxial annular channels in said plate, means for admitting a coolant to the outer channel and for removing the coolant from the innermost channel, the extension of the outermost of said channels in the direction of the longitudinal axis of the piston being substantially equal to that of said peripheral portion whereby all compression rings are adjacent to the outermost channel.

2. A cooled piston as defined in claim 1, in which said cooling channel system includes an additional annular channel located in the top closure portion of said main piston body, and communicating with a channel in said plate.

3. A cooled piston as defined in claim 2 in which said additional channel is provided with an outlet aperture for discharging coolant into the interior of said main piston body.

4. A cooled piston as defined in claim 1, in which said cooling channel system includes a central coolant collecting chamber having a portion formed by said crown plate, and having a portion formed by said top closure portion, and radial channels connecting said collecting chamber with the innermost of said annular channels.

5. A cooled piston as defined in claim 1, in which said cooling system includes a recess in the top closure portion of said main piston body, said additional channel being open at the top of said closure portion, the innermost channel in said crown plate being open at the bottom of said plate and adjacent to said recess, a wall element being located between said recess and said innermost channel for separating said recess from said channel, and an aperture in said wall element effecting communication between said recess and said channel.

6. A cooled piston according to claim 5, in which said wall element has a portion extending into said innermost channel and having an upper surface which is spaced from the inside surface of said innermost channel.

7. A cooled piston according to claim 5, in which said wall element is provided with recesses effecting whirling of the coolant flowing along said wall element.

8. A cooled piston according to claim 5, in which said wall element is provided with radial cuts effecting whirling of the coolant flowing along said wall element.

9. A cooled piston as defined in claim 1, in which said channels are open at the bottom of said crown plate, the top of said top closure portion being provided with a plurality of cavities communicating with a channel in said crown plate for receiving coolant therefrom, said cavities being separated by radial ribs.

10. A cooled piston as defined in claim 1, in which said channels are open at the bottom of said crown plate, the top of said top closure portion being provided with a plurality of cavities placed below one of said channels, a recess in said top closure portion interconnecting said cavities, a wall member interposed between said cavities and the channel below which said cavities are placed, and an aperture in said wall element effecting communication between said cavities and the channel below which said cavities are placed.

References Cited in the file of this patent

UNITED STATES PATENTS

| | | |
|---|---|---|
| 1,852,861 | Simmen | Apr. 5, 1932 |
| 2,657,678 | Maybach | Nov. 3, 1953 |

FOREIGN PATENTS

| | | |
|---|---|---|
| 19,815 | Great Britain | Sept. 15, 1915 |
| 416,900 | Germany | July 29, 1925 |